US012768203B2

(12) United States Patent
Bičič et al.

(10) Patent No.: US 12,768,203 B2
(45) Date of Patent: Oct. 20, 2026

(54) DOOR LOCK

(71) Applicant: ILLINOIS TOOL WORKS INC., Glenview, IL (US)

(72) Inventors: Bojan Bičič, Srpenica (SI); Jože Lavrenčič, Kobarid (SI)

(73) Assignee: ILLINOIS TOOL WORKS INC., Glenview, IL (US)

( * ) Notice: Subject to any disclaimer, the term of this patent is extended or adjusted under 35 U.S.C. 154(b) by 46 days.

(21) Appl. No.: 18/920,247

(22) Filed: Oct. 18, 2024

(65) Prior Publication Data

US 2025/0129633 A1 Apr. 24, 2025

(30) Foreign Application Priority Data

Oct. 20, 2023 (EP) .................................... 23205006

(51) Int. Cl.
*E05B 47/00* (2006.01)

(52) U.S. Cl.
CPC .. *E05B 47/0002* (2013.01); *E05B 2047/0068* (2013.01)

(58) Field of Classification Search
CPC ............. E05B 47/00; E05B 2047/0068; E05B 2047/0024; E05B 2047/005; E05B 65/00; E05B 15/00; E05B 47/0001; E05B 47/0603; E05B 51/00; E05B 63/185; E05B 17/22; A47L 15/4259; D06F 34/20; D06F 39/14; D06F 37/42; D06F 2103/40; Y10S 292/69; Y10T 292/1021; Y10T 292/1039; Y10T 292/1043; E05Y 2900/312
USPC ........................................................... 70/277
See application file for complete search history.

(56) References Cited

U.S. PATENT DOCUMENTS 3,617,957 A * 11/1971 Brighenti ............ E05B 47/0009 337/77
5,520,424 A * 5/1996 Hapke ..................... D06F 37/42 292/341.17
5,838,125 A * 11/1998 Choi ..................... E05F 15/611 318/446
7,900,979 B2 * 3/2011 Bragg ................. A47L 15/4259 292/144
8,556,308 B2 * 10/2013 Lavrencic ............... D06F 37/42 292/341.15

(Continued)

FOREIGN PATENT DOCUMENTS

BR 112016022590 B1 * 3/2022 ............. D06F 34/20
CN 106235984 B * 7/2018 ......... A47L 15/4259

(Continued)

*Primary Examiner* — Steven A Tullia
(74) *Attorney, Agent, or Firm* — Pauley Erickson & Swanson

(57) ABSTRACT

A door locking device for a door of a household appliance includes a door sensing contact having an engaged configuration and a disengaged configuration, a sensing pin configured to activate the disengaged configuration of the door sensing contact when the door is opened, a main power contact having an engaged configuration and a disengaged configuration, a cut-out trigger configured to activate the disengaged configuration of the main power contact when the door is open, a cut-out pin configured to disengage the main power contact and the door sensing contact when the door is forcibly opened, a locking pin moveable between a door-locked and a door-unlocked position.

16 Claims, 4 Drawing Sheets

(56) References Cited

U.S. PATENT DOCUMENTS

| | | | | |
|---|---|---|---|---|
| 9,217,217 | B2 * | 12/2015 | Kasack | D06F 39/14 |
| 9,487,907 | B2 * | 11/2016 | Hapke | D06F 39/14 |
| 10,472,858 | B2 * | 11/2019 | Rocchitelli | E05B 47/0002 |
| 10,806,322 | B2 * | 10/2020 | Dirnberger | E05B 47/0603 |
| 10,829,881 | B2 * | 11/2020 | Choi | E05C 19/022 |
| 10,914,026 | B2 * | 2/2021 | Uros | D06F 39/14 |
| 11,001,959 | B2 * | 5/2021 | Promutico | D06F 39/14 |
| 11,299,913 | B2 * | 4/2022 | Promutico | E05B 47/0603 |
| 11,566,447 | B2 * | 1/2023 | Promutico | D06F 39/14 |
| 11,846,063 | B2 * | 12/2023 | Chirumbolo | E05B 47/0001 |
| 11,952,802 | B2 * | 4/2024 | Promutico | E05B 65/00 |
| 12,320,172 | B2 * | 6/2025 | Wang | D06F 39/14 |
| 2008/0106105 | A1 * | 5/2008 | Spiessl | D06F 39/14 292/210 |
| 2012/0175894 | A1 | 7/2012 | Hapke et al. | |
| 2019/0292714 | A1 * | 9/2019 | Bicic | D06F 39/14 |
| 2020/0354988 | A1 | 11/2020 | Dirnberger et al. | |
| 2021/0222459 | A1 * | 7/2021 | Promutico | D06F 37/42 |
| 2024/0093534 | A1 * | 3/2024 | Chirumbolo | D06F 39/14 |

FOREIGN PATENT DOCUMENTS

| | | | | | |
|---|---|---|---|---|---|
| CN | 110499962 | B | * | 4/2021 | D06F 37/42 |
| DE | 2059318 | A1 | * | 5/1972 | D06F 37/10 |
| DE | 10 2016 008 317 | A1 | | 1/2018 | |
| DE | 10 2020 210 745 | A1 | | 3/2021 | |
| EP | 0172331 | B1 | * | 3/1988 | E05B 47/0009 |
| GB | 2364350 | A | * | 1/2002 | E05B 47/0009 |
| IT | 1195908 | B | * | 11/1988 | D06F 37/42 |
| SI | 21887 | A | * | 4/2006 | D06F 34/20 |
| WO | WO-2005106099 | A1 | * | 11/2005 | D06F 37/42 |
| WO | WO-2013151964 | A1 | * | 10/2013 | E05B 47/0009 |
| WO | WO-2013181289 | A1 | * | 12/2013 | E05B 47/0603 |
| WO | WO-2015187223 | A1 | * | 12/2015 | E05B 47/06 |
| WO | WO 2023/076057 | A1 | | 5/2023 | |

* cited by examiner

DOOR LOCK

CROSS-REFERENCE TO RELATED APPLICATION(S)

European Patent Application No. EP 23205006.2, filed on 20 Oct. 2023, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

In many appliances, such as washing machines, dishwashers, and dryers, it is important to ensure the appliance ceases operation when the door is opened. This safety mechanism prevents certain negative outcomes. Traditional systems employ door switches or sensors that immediately stop the appliance when the door is pulled on or if the door is not fully closed.

However, these mechanisms can be overly sensitive to minor disturbances, such as the door being lightly pulled or vibrating due to operation or external factors. Such disturbances may unintentionally interrupt the operation of the appliance, leading to inconvenience and inefficiency.

There is a need for an improved locking mechanism that can distinguish between minor disturbances, such as a door being lightly pulled or vibrating, and a door being forced open.

The present invention solves at least some of the problems associated with the prior art.

SUMMARY OF THE INVENTION

In one aspect, a door locking device for a door of a household appliance, includes a door sensing contact having an engaged configuration and a disengaged configuration, a sensing pin configured to activate the disengaged configuration of the door sensing contact when the door is opened, a main power contact having an engaged configuration and a disengaged configuration, a cut-out trigger configured to activate the disengaged configuration of the main power contact when the appliance cycle finishes, a cut-out pin configured to disengage the main power contact and the door sensing contact when the door is forcibly opened, a locking pin moveable between a door-locked and a door-unlocked position.

Advantageously, the present invention provides a main power contact and a separate door sensing contact, allowing the door locking device to sense when the door is closed, when the door is open, and, with the cut-out pin when the door has been forced open and the main power should be cut. This combination of features provides additional information about the open, closed, locked, damaged status of the door, meaning that the device such as a washing machine can take appropriate actions in accordance with the state of the main power contact and the door sensing contact and the combination of signals coming from each. For example, when the door sensing contact enters the engaged configuration, the washing machine can trigger a signal to lock the door and if the door is subsequently forced open, the main power contact will enter the disengaged configuration, and electrical power to the machine can be stopped.

In an embodiment, the door locking device further includes a coupling member, which is operably engageable with the cut-out trigger and the locking pin, such that when said locking pin is in said door-unlocked position, said cut-out trigger activates the disengaged configuration of the main power contact.

Advantageously, the coupling member connects the cut-out trigger and the locking pin such that when the locking pin is in the door-unlocked position, the main power contact is in the disengaged configuration and when the locking pin is in the door-locked position, the main power contact can be in the engaged configuration.

In an embodiment, the door locking device includes an electromagnetic driving mechanism adapted to actuate said coupling member between a first position (locked position) and a second position (unlocked position), wherein said first position said coupling member urges the locking pin into the door-locked position and urges the cut-out trigger away from the main power contact.

In an embodiment, when said door sensing contact is engaged, said electromagnetic driving mechanism is configured to actuate said coupling member toward said first position.

In an embodiment, the door locking device the sensing pin is configured to disengage the main power contact and the door sensing contact when the door is open.

Advantageously, the sensing pin can disengage each of the main power contact and the door sensing contact when the door is open.

In an embodiment, the cut-out pin is configured to engage with a cam surface of said door or a cam surface of a safety slider associated with the door as the door is opened to disengage the main power contact.

Advantageously, as the door is opened, the cut-out pin engages with the door and the main power contact to force it into the disengaged configuration.

In an embodiment, when said coupling member is in said second position said coupling member urges the locking pin into the door-unlocked position and urges the cut-out trigger to urge the main power contact into the disengaged configuration.

Advantageously, when the door is unlocked, the main power contact disengages, ensuring that the power supply is disengaged when appropriate.

In an embodiment, the cut-out trigger further comprises a leg and wherein when said coupling member is in the first position, the leg arrests the sensing pin such that if the door is opened whilst the coupling member is in the first position, the door sensing contact remains in the engaged configuration and the main power contact remains in the engaged configuration.

In an embodiment, when said door sensing contact is engaged, said electromagnetic driving mechanism allows said coupling member to rotate toward said second position.

Advantageously, when the door sensing contact is engaged, the electromagnetic driving mechanism releases the locking pin.

In an embodiment, said coupling member includes a first cam surface which engages with said locking pin.

In an embodiment, said coupling member includes a second cam surface which engages with said cut-out trigger.

In an embodiment, when coupling member is in said first position, the cut-out trigger arrests the sensing pin.

Advantageously, the sensing pin is arrested whilst the locking pin is engaged, and the door is closed.

In an embodiment, there is provided a door locking device for a door of a household appliance, comprising a door sensing contact having an engaged configuration and a disengaged configuration. A sensing pin is configured to activate the disengaged configuration of the door sensing contact when the door is opened. A main power contact is provided, having an engaged configuration and a disengaged configuration as well as a cut-out trigger configured to activate the disengaged configuration of the main power contact when the appliance cycle finishes, and a cut-out pin configured to disengage the main power contact and the door sensing contact when the door is opened. There is a locking pin moveable between a door-locked and a door-unlocked position, wherein the cut-out trigger further comprises a leg which is configured to arrest the sensing pin when the door is locked.

In one aspect, a household appliance includes the door locking device as described above.

BRIEF DESCRIPTION OF SEVERAL VIEWS OF THE DRAWINGS

Embodiments of the invention are now described, by way of example only, hereinafter with reference to the accompanying drawings.

DESCRIPTION OF PREFERRED EMBODIMENTS

Figure 1:
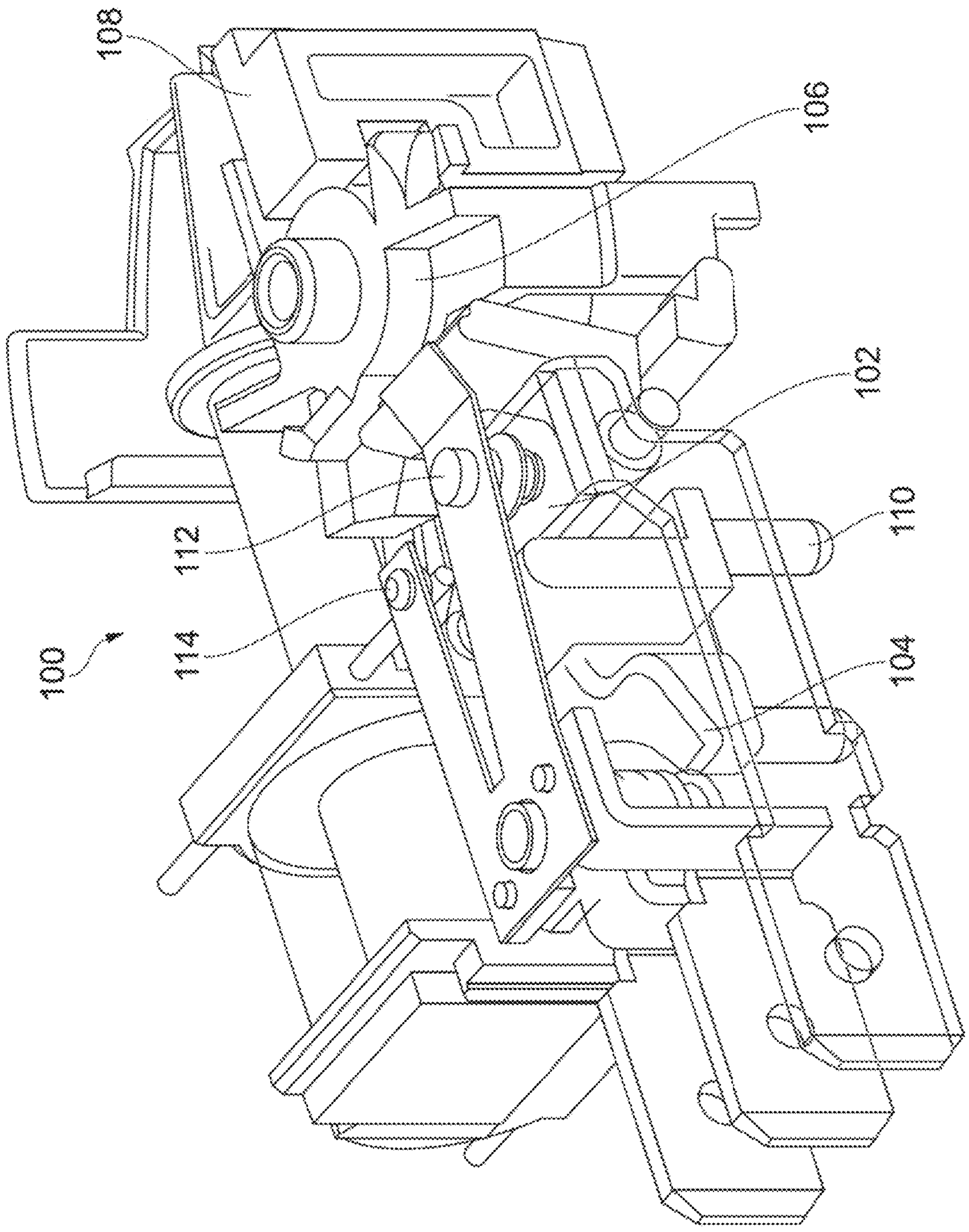
FIG. 1 illustrates a perspective view of a door locking device.

Certain terminology is used in the following description for convenience only and is not limiting. The words 'right', 'left', 'lower', 'upper', 'front', 'rear', 'upward', 'down' and 'downward' designate directions in the drawings to which reference is made and are with respect to the described component when assembled and mounted. The words 'inner', 'inwardly', 'outer' and 'outwardly' refer to directions toward and away from, respectively, a designated centerline or a geometric center of an element being described (e.g. central axis), the particular meaning being readily apparent from the context of the description.

Further, as used herein, the terms 'connected', 'attached', 'coupled' and 'mounted' are intended to include direct connections between two members without any other members interposed therebetween, as well as, indirect connections between members in which one or more other members are interposed therebetween. The terminology includes the words specifically mentioned above, derivatives thereof, and words of similar import.

Further, unless otherwise specified, the use of ordinal adjectives, such as, "first", "second" and "third" etc. merely indicate that different instances of like objects are being referred to and are not intended to imply that the objects so described must be in a given sequence, either temporally, spatially, in ranking or in any other manner.

Like reference numerals are used to depict like features throughout.

FIG. 1 illustrates a perspective view of a door locking device 100 according to one embodiment of the present invention. The door locking device 100 of FIG. 1 comprises a cut-out trigger 102, sensing pin 104, coupling member 106, locking pin 108, cut-out pin 110, main power contact 112 and a door sensing contact 114. The sensing pin 104 and the cut-out pin 110 are configured to move linearly and interact with at least one of the main power contact 112 and the door sensing contact 114. In the example shown the sensing pin 104 is in contact with the cut-out pin 110 such that if the sensing pin moves upward (towards the door sensing contact 114) then the cut-out pin 110 will also move upwards (towards the main power contact 112). The sensing pin 104 and the cut-out pin 110 are configured to interact with a feature or features of a door of a household appliance or with features which are actuated by and/or connected to the door of the household appliance in order to determine the status of the door i.e. open, closed, locked, forcibly opened, etc.

A cut-out trigger 102 is used to push the main power contact 112 from an engaged configuration to a disengaged configuration. In the engaged configuration, the main power contact allows electrical communication between a first component of the appliance and a second component of the door locking device 100 and when disengaged, electrical communication is not possible between those components thereby establishing a binary signal. The cut-out trigger 102 is used to selectively arrest the sensing pin 104 when the door is locked.

To lock the door, the locking pin 108 actuates between a door-unlocked position and a door-locked position in which the door locking pin blocks movement of a locking slider associated with the door to prevent the door from opening. In the door-locked state, the door will not open when an opening force is applied, unless enough force is applied to break the door locking pin or another component which holds the door in place. In this circumstance, the cut-out pin 110 is forced upwards by interacting with a safety slider which cooperates with the door striker or the door or a component attached to the door, and forcing the main power contact 112 into the disengaged configuration and either causing the power to be cut to the device as a whole or causing a signal indicative of an error.

The actuation of the locking pin 108 is achieved by rotating a coupling member 106 which includes a first surface for interacting with the locking pin 108 and a second surface for interacting with the cut-out trigger 102. The first and second surfaces may be cam surfaces such that as the coupling member 106 rotates in a first direction, the locking pin 108 moves from a door-unlocked position to a door-locked position and simultaneously the cut-out trigger 102 moves from a position forcing the main power contact 112 from the disengaged configuration to a position allowing the main power contact 112 to enter the engaged configuration. The main power contact 112 only enters the engaged configuration if the cut-out pin 110 also does not prevent it from doing so. Therefore, the main power contact 112 can only be in the engaged configuration if the coupling member 106 moves the cut-out trigger 102 into position and the cut-out pin 110 is in position away from the main power contact 112.

Figure 2A:
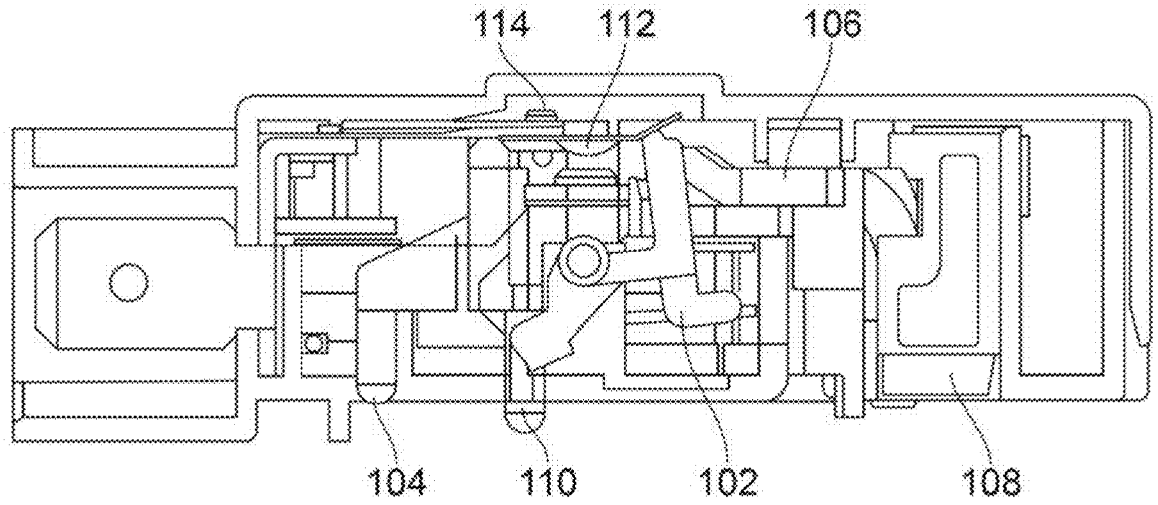
FIG. 2A shows the door locking device in the door open configuration.

FIG. 2A shows a side view of the door locking device 100 with the sensing pin 104 and the cut-out pin 110 in the door open position and as such, the door sensing contact 114 and the main power contact 112 in the disengaged configuration. The coupling member 106 is in the second position such that the locking pin 108 is in the door-unlocked position and the cut-out trigger 102 is urging the main power contact 112 into the disengaged configuration.

Figure 2B:
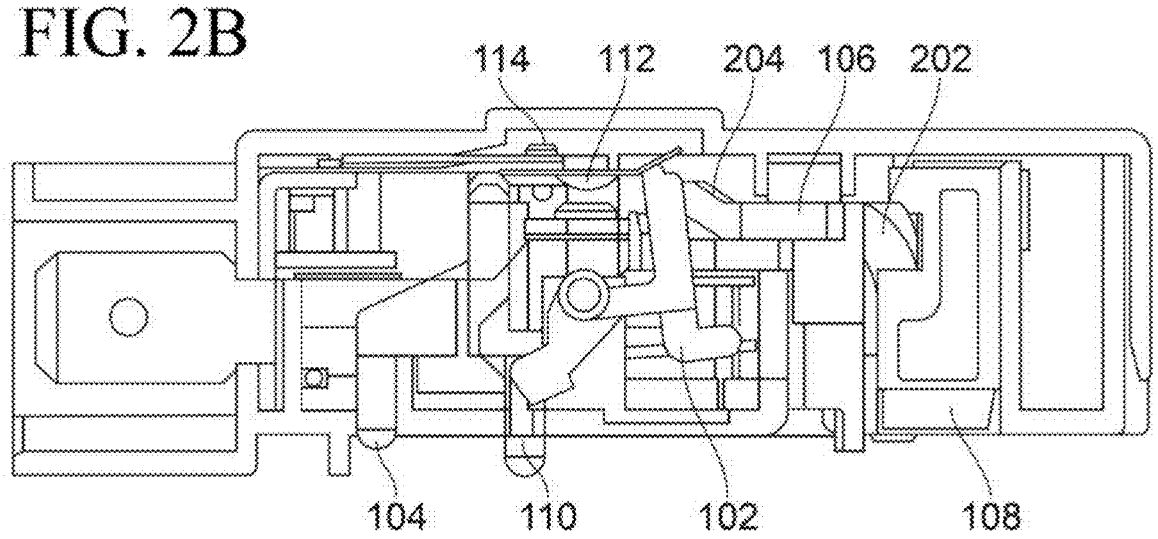
FIG. 2B shows the door locking device in the door closed but not locked configuration.

FIG. 2B shows the situation as the door closes. The door sensing contact 114 is resilient and defaults to a closed position (e.g. being formed of a spring material). The resilience of the door sensing contact 114 is sufficient to also urge the sensing pin 104 into the engaged configuration. In this way, the door locking device 100 prompts the sensing pin 104 to move downwards away from the door sensing contact 114 and allowing it to enter the engaged configuration. At this stage, the cut-out trigger 102 prevents the main power contact 112 from entering the engaged configuration and the locking pin 108 remains in the door-unlocked position.

As the door sensing contact 114 enters the engaged configuration, a signal is generated to activate a driving mechanism which may be an electromagnetic driving mechanism (not shown). The driving mechanism acts to rotate the coupling member 106 which has a first cam surface 202 for interacting with the locking pin 108 and a second cam surface 204 for interacting with the cut-out trigger 102.

Figure 2C:
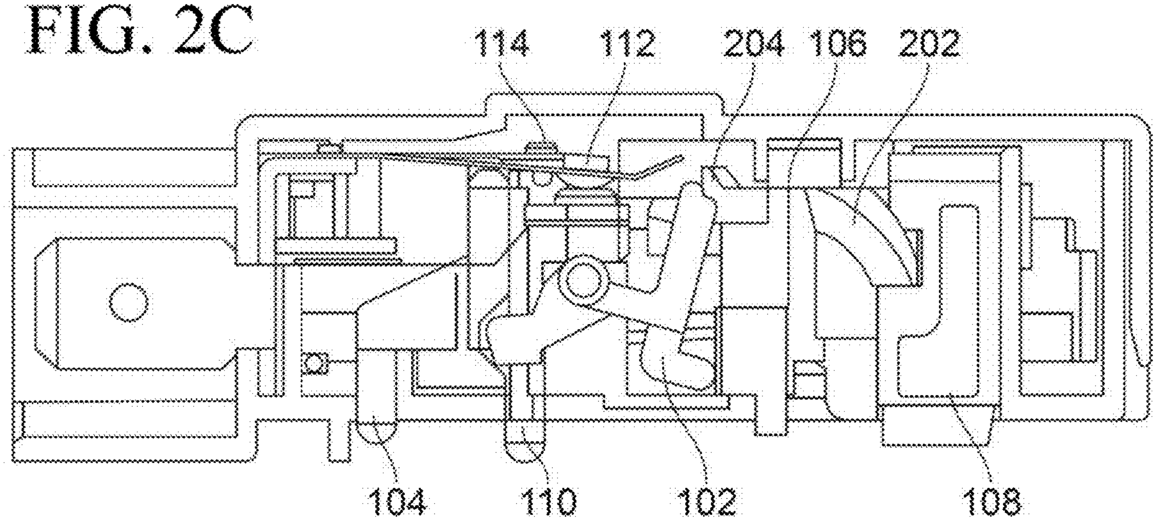
FIG. 2C shows the door locking device in the door locked configuration.

FIG. 2C shows the door locking device 100 after the coupling member 106 has fully rotated into the first position (locked position). In some embodiments of the invention, the coupling member 106 is rotated by an electromagnetic driving mechanism (not shown). The first cam surface 202 urges the locking pin 108 into the door-locked position in which it protrudes from a housing of the door locking device 100. The second cam surface 204 interacts with the cut-out trigger 102 and allows it to rotate about a fulcrum point, allowing the main power contact 112 to enter the engaged configuration. The main power contact 112, like the 114, is formed of a spring material, and is resilient, such that the main power contact 112 is inherently urged towards the engaged configuration. When the main power contact 112 enters the engaged configuration, the door locking device 100 may provide a signal that the household appliance can be activated i.e. that a washing cycle may commence.

Figure 3:
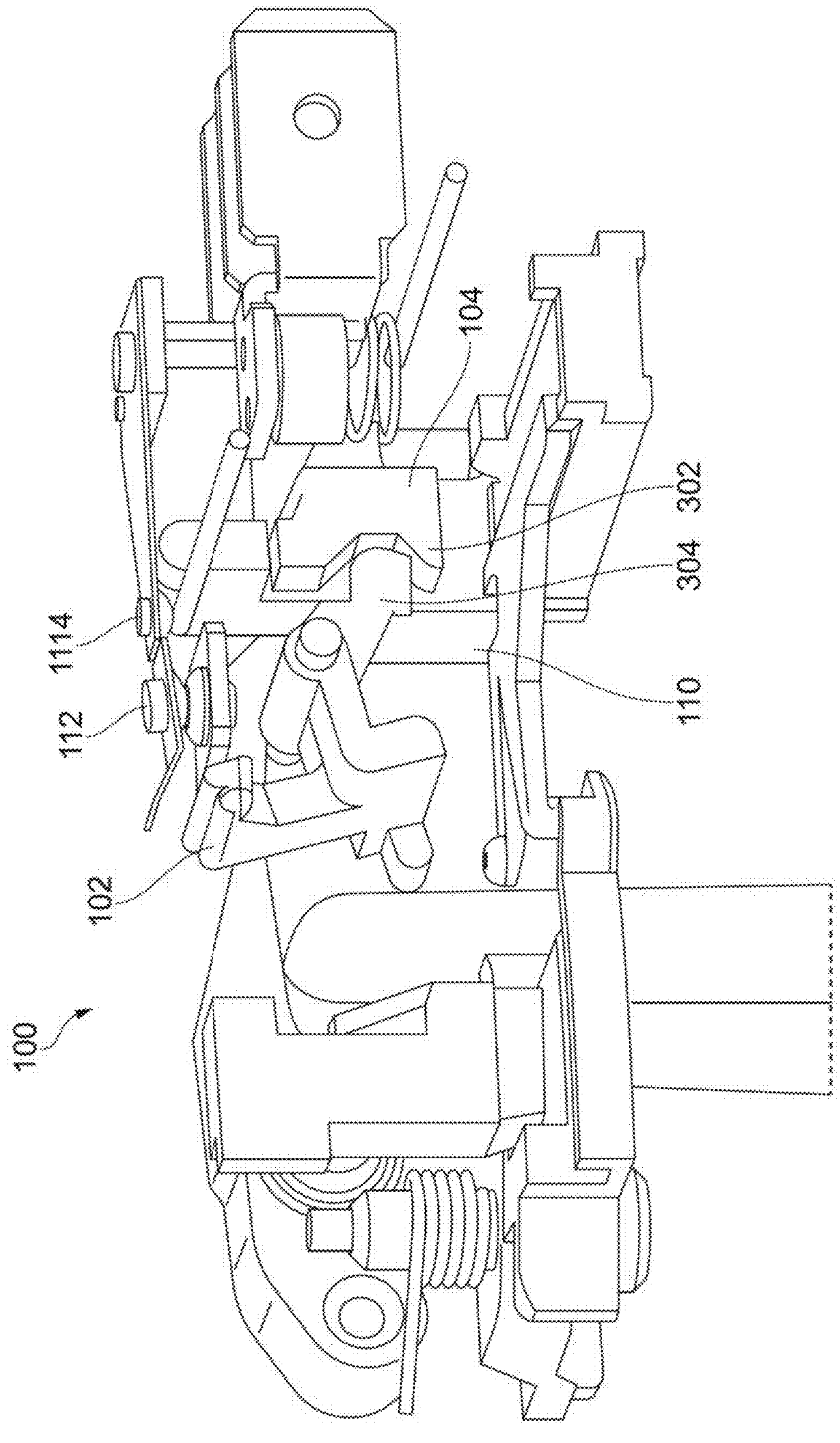
FIG. 3 illustrates a perspective view of a door locking device.

FIG. 3 shows an alternative view of the door locking device 100. A leg 304 of the cut-out trigger 102 enters a notch 302 in the sensing pin 104. The leg 304 prevents the sensing pin 104 from moving to disengage the door sensing contact 114. As such, the risk of interruptions to the cycle are reduced because the sensing pin 104 is held in place and vibrations or light or heavy forces acting on the door will not cause the sensing pin to disengage the door sensing contact 114 or the main power contact 112. Furthermore, the sensing pin 104 may be provided with slack movement, whereby small movements in travel of the sensing pin are not transferred on to the cut-out pin until the slack movement is exhausted. The amount of slack movement permitted effectively defines a threshold, a minimum movement is required to overcome this threshold before the door sensing contact is disengaged. This is achieved by ensuring that the sensing pin 104 is not in contact with the cut-out pin, when at rest. A similar solution can also be achieved by providing the cut-out pin 110 or the door sensing contact with slack movement instead of the sensing pin 104.

Figure 4:
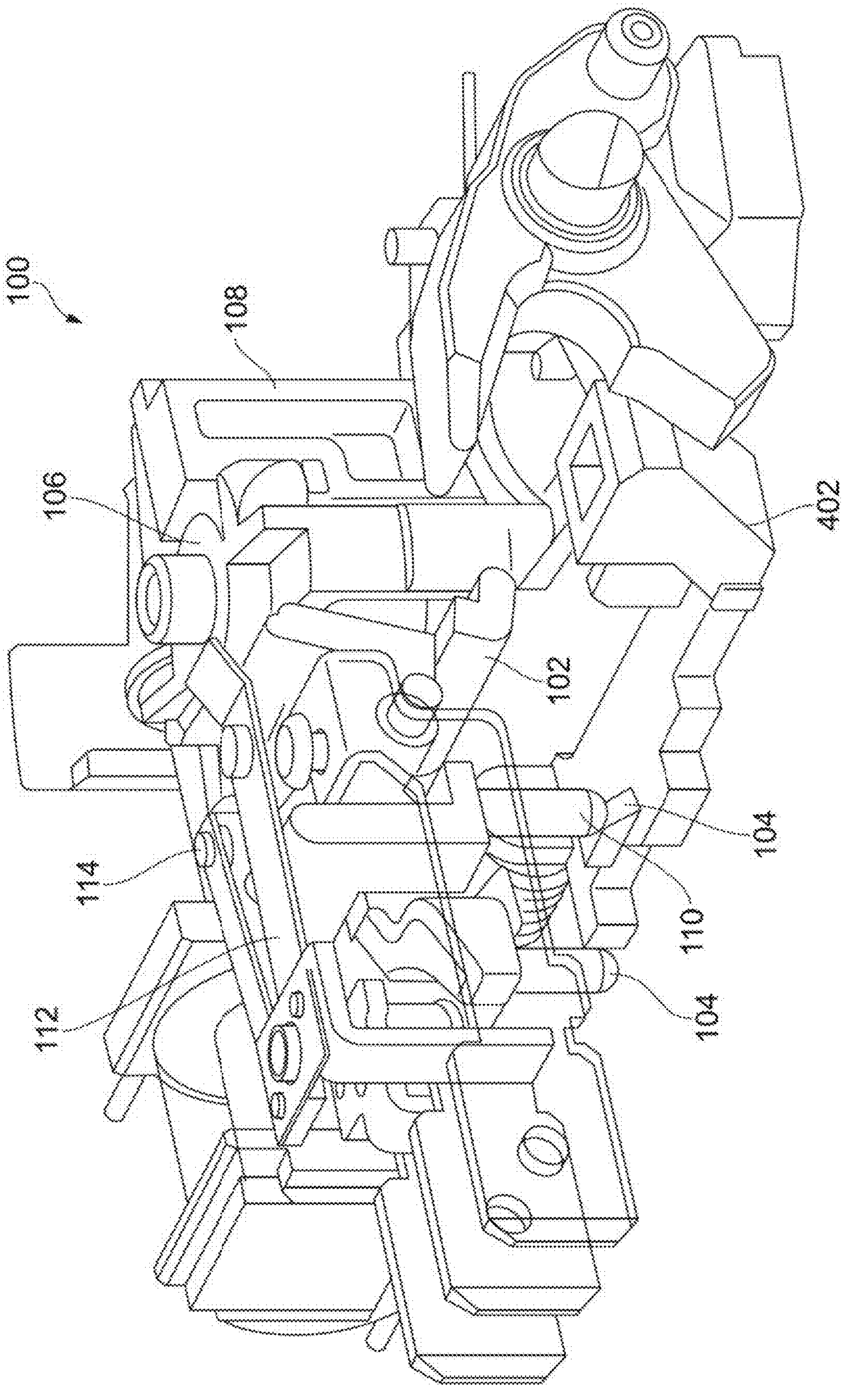
FIG. 4 illustrates a further view of a door locking device.

FIG. 4 illustrates a door locking device 100 comprising a cut-out trigger 102, sensing pin 104, coupling member 106, locking pin 108, cut-out pin 110, main power contact 112, door sensing contact 114, as described above. In some embodiments of the present invention, the cut-out pin 110 interacts with a safety slider 402 which is cooperating with the door of the household appliance. The safety slider moves linearly as the door opens and closes and a cut-out cam 404 translates this motion to interact with the cut-out pin 110. As the door opens, a cut-out cam 404 of the safety slider 402 urges the cut-out pin 110 towards the main power contact 112 and/or the door sensing contact 114 such that as the door opens, the main power contact 112 and/or the door sensing contact 114 are urged into the disengaged configuration.

It will be appreciated by persons skilled in the art that the above detailed examples have been described by way of example only and not in any limitative sense, and that various alterations and modifications are possible without departing from the scope of the invention as defined by the appended claims. Various modifications to the detailed examples described above are possible.

Through the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract or drawings), or to any novel one, or any novel combination, of the steps of any method or process so disclosed.

The invention claimed is:

1. A door locking device for a door of a household appliance, comprising:

a door sensing contact having an engaged configuration and a disengaged configuration;

a sensing pin configured to activate the disengaged configuration of the door sensing contact when the door is opened;

a main power contact having an engaged configuration and a disengaged configuration;

a cut-out trigger configured to activate the disengaged configuration of the main power contact;

a cut-out pin configured to disengage the main power contact and the door sensing contact when the door is forcibly opened;

a locking pin moveable between a door-locked and a door-unlocked position;

a coupling member, which is operably engageable with the cut-out trigger and the locking pin, such that when the locking pin is in the door-unlocked position, the cut-out trigger activates the disengaged configuration of the main power contact; and an electromagnetic driving mechanism adapted to actuate the coupling member between a first position and a second position, wherein in the first position the coupling member urges the locking pin into the door-locked position and urges the cut-out trigger away from the main power contact.

2. The door locking device of claim 1 wherein when the coupling member is in the second position the coupling member urges the locking pin into the door-unlocked position and urges the cut-out trigger to urge the main power contact into the disengaged configuration.

3. The door locking device of claim 2 wherein the sensing pin is configured to disengage the door sensing contact when the door is open and the coupling member is in the second position.

4. The door locking device of claim 1 wherein the cut-out trigger further comprises a leg and wherein when the coupling member is in a first position, the leg arrests the sensing pin such that if the door is attempted to be opened while the coupling member is in the first position, the door sensing contact remains in the engaged configuration and the main power contact remains in the engaged configuration.

5. The door locking device of claim 1 wherein when the door sensing contact is engaged, the electromagnetic driving mechanism is configured to actuate the coupling member toward the first position.

6. The door locking device of claim 1 wherein when the door sensing contact is engaged, the electromagnetic driving mechanism allows the coupling member to move toward the second position.

7. The door locking device of claim 1 wherein the coupling member comprises a first cam surface which engages with the locking pin.

8. The door locking device of claim 1 wherein the coupling member comprises a second cam surface which engages with the cut-out trigger.

9. The door locking device of claim 1 wherein when coupling member is in the first position, the cut-out trigger arrests the sensing pin.

10. The door locking device of claim 1 wherein the cut-out pin is configured to engage with a cam surface of the door or a cam surface of a safety slider cooperating with the door as the door is opened to disengage the main power contact.

11. A household appliance comprising the door locking device of claim 1.

12. A door locking device for a door of a household appliance, comprising:

a door sensing contact having an engaged configuration and a disengaged configuration;

a sensing pin configured to activate the disengaged configuration of the door sensing contact when the door is opened;

a main power contact having an engaged configuration and a disengaged configuration;

a cut-out trigger configured to activate the disengaged configuration of the main power contact;

a cut-out pin configured to disengage the main power contact and the door sensing contact when the door is opened, wherein the cut-out trigger further comprises a leg which is configured to arrest the sensing pin when the door is locked;

a locking pin moveable between a door-locked and a door-unlocked position;

a coupling member, which is operably engageable with the cut-out trigger and the locking pin, such that when the locking pin is in the door-unlocked position, the cut-out trigger activates the disengaged configuration of the main power contact; and an electromagnetic driving mechanism adapted to actuate the coupling member between a first position and a second position, wherein in the first position the coupling member urges the locking pin into the door-locked position and urges the cut-out trigger away from the main power contact.

13. The door locking device of claim 12 wherein when the coupling member is in the second position the coupling member urges the locking pin into the door-unlocked position and urges the cut-out trigger to urge the main power contact into the disengaged configuration.

14. The door locking device of claim 12 wherein the leg arrests the sensing pin such that if the door is attempted to be opened while the coupling member is in the first position, the door sensing contact remains in the engaged configuration and the main power contact remains in the engaged configuration.

15. The door locking device of claim 12 wherein when the door sensing contact is engaged, the electromagnetic driving mechanism is configured to actuate the coupling member toward the first position.

16. The door locking device of claim 12 wherein when the door sensing contact is engaged, the electromagnetic driving mechanism allows the coupling member to move toward the second position.

* * * * *